United States Patent Office 3,127,633
Patented Apr. 7, 1964

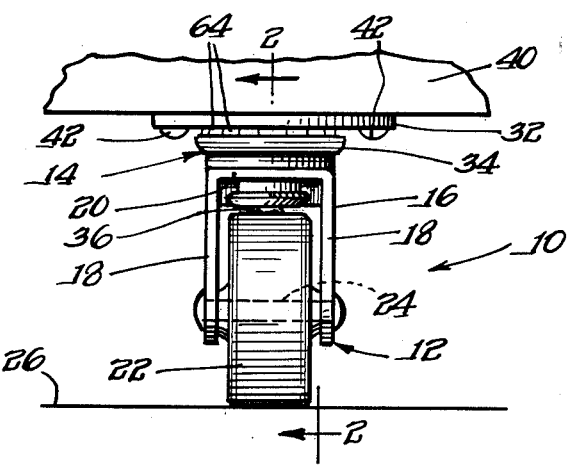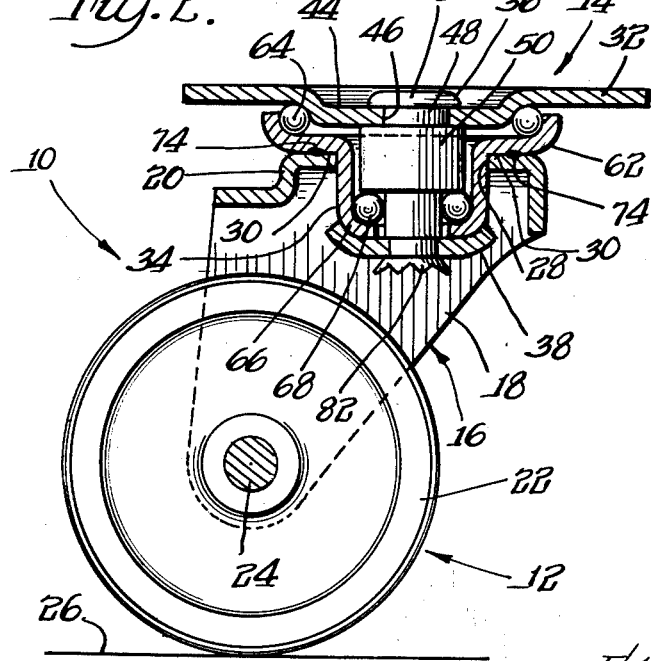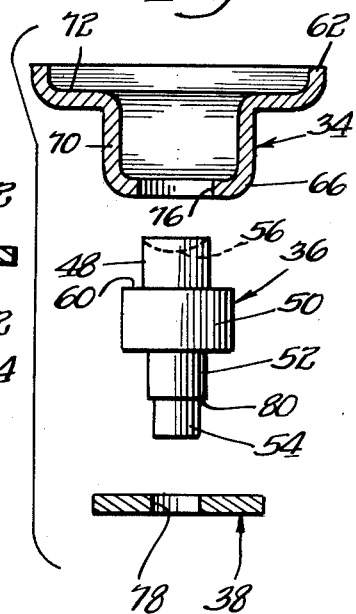

3,127,633
DUAL RACE CASTER
Edward H. Schultz, Jr., Chicago, Ill., assignor to Nagel-Chase Manufacturing Company, Chicago, Ill., a corporation of Illinois
Filed Aug. 31, 1961, Ser. No. 135,278
3 Claims. (Cl. 16—21)

This invention relates generally to caster devices and especially to caster devices incorporating dual ball-bearing races.

According to customary practice, caster devices that incorporate one or more anti-friction ball races employ hardened steel balls in order to insure a prolonged and effective life for the unit. Concomitantly, the races in which these hardened balls operate must be fashioned of hard or hardenable material. This latter requirement has led to expensive structures calling for past parts or separate, hardened rings for insertion in the races. Nevertheless, these schemes have avoided the necessity of hardening all or part of the wheel yoke or horn. However, the structures which have been heretofore proposed have necessitated completely individual tooling for each size of caster to be produced; and this situation has tended to dissuade manufacturers from providing casters in a wide variety of sizes.

Therefore, an important object of the present invention is to provide a caster arrangement including a race unit which is readily assembled to different sized wheel yokes.

Another object of the invention is to provide a caster device incorporating a standardized race unit.

A more general object of the invention is to provide a new and improved caster of the dual race type.

A further object of the invention is to provide a caster device which is simple to assemble and economical to produce.

Additional objects and features of the invention pertain to the particular structure and arrangements whereby the above objects are attained.

A structure in accord with the invention includes a rollable support unit comprising a yoke and a rotatable wheel; and a dual race unit comprising a structure defining a pair of spaced races and a surface abuttable with a cooperating surface of the support unit, the race unit further including anti-friction balls in the races and a means situated interiorly of the structure confronting the races to retain the balls therein.

The invention, both to its structure and mode of operation, will be better understood by reference to the following disclosure and drawing forming a part thereof, wherein:

FIG. 1 is a front elevational view of a caster constructed in accordance with the principles of the invention and shown supporting one corner of an object;

FIG. 2 is an enlarged view taken through the section 2—2 of FIG. 1; and

FIG. 3 is an exploded, side elevational view of the cup-like member, the stud member and the washer element of the caster of the invention.

Referring now in detail to the drawing, specifically to FIGS. 1 and 2, a dual race caster device indicated generally by the numeral 10 will be seen to include a rollable support unit 12 and a dual race unit 14. The support unit 12 comprises a caster horn or yoke 16 that is fashioned with vertical side plates 18, plates 18 being spaced apart and interconnected by a web 20. Advantageously, the yoke 16 is stamped or pressed from a suitable sheet material such as low carbon sheet steel. The support unit 12 also comprises a wheel 22 which is rotatably mounted between the vertical side plates 18 by means of an axle 24, the wheel 22 being adapted to engage and ride on a floor 26 or some other ground surface.

The web portion 20 of yoke 16 is provided with a vertically opening aperture 28 which is elevated above the wheel 22. The web 20 also defines a horizontal bearing surface 30 surrounding the aperture 28; and as will be brought out more fully hereinafter, the race unit 14 passes partly through aperture 28 in assembly to be fastened to the support unit 12 at the annular bearing surface 30.

As is particularly well shown in FIG. 2, the race unit 14 comprises an upper plate 32, a cup-like member 34, a stud member 36 and a washer element 38. The upper plate 32 is arranged to be affixed to some object which it is desired to support in swivelable fashion; and as is shown in FIG. 1, the plate 32 is capable of being fastened to the base or a dolly or truck 40 or some similar object by means of screws 42 or other suitable fasteners. In compliance with the invention, the plate 32 is fashioned with a depending, circular boss 44, and a central aperture 46 is punched or bored in the boss 44.

With reference to FIG. 3, the stud member 36 includes an upper stem portion 48, a central body portion 50 in the form of an enlargement, a lower stem portion 52 and a bottom end portion 54. The stem portion 48 is arranged to pass freely through the aperture 46 in boss 44 and is originally fashioned with a terminal recess or depression 56. The recess 56 facilitates the formation of a head 58 shown in FIG. 2, the head 58 confining the edges of aperture 46 against axial movement relative to the stem portion 48 in one direction. An annular shoulder 60 of body portion 50 restricts relative movement of the stud member 36 in the opposite direction thereby coupling the stud member to the upper plate 32. Thus, the shoulder 60 and the head 58 provide surface formations to interlock the stud with the boss.

The cup-like member 34 is adapted to be situated generally surrounding the stud member 36 underlying the upper plate 32, the cup-like member 34 comprising a hardened, upper, annular ball-race portion 62 which is intended to be situated in spaced apart, opposed relationship with the circular sidewall of boss 44. A number of anti-friction ball bearings 64 may thus be confined between the race portion 62 and the boss 44.

The cup-like member 34 also comprises a hardened, lower, annular ball-race portion 66 spaced vertically apart of the race portion 62 and adapted to confront the stud member 36 at the juncture between the body portion 50 and the lower stem portion 52. A number of anti-friction ball bearings 68 may thus be confined between the race portion 66 and the stud member 36 as is shown in FIG. 2 with the lower surface of the enlargement and the stem portion 52 forming ball-race means. Advantageously, those portions of stud member 36 and plate 32 which are to be contacted by the ball bearings are hardened similarly to the race portions 62 and 66.

Intermediate the race portions, the cup-like member 34 includes a vertical throat portion 70 and a horizontal, annular bearing portion 72, portion 70 being juxtaposed with the lower, ball-race 66 and the surface portion 72 being juxtaposed with the upper, ball-race portion 62 as shown in FIG. 3. The throat portion 70 surrounds the central body portion 50 of stud member 36 in spaced apart relationship and is adapted to pass through the aperture 28 fashioned in yoke 16. Thus, the bearing surface 30 of the yoke is confrontable by the lower area of bearing surface portion 72.

Arcuately spaced weldments 74 are advantageously employed for fastening the cup-like member 34 to the yoke 16, and it will be noted that the weldments 74 are situated in a location away from the race portions 62 and 66. Thus, heat from the welding operation does not adversely affect the hardened portions. The only connection between the race unit 14 and the support unit 12 is achieved at the weldment 74. Accordingly, any number of different sized support units can be affixed to a given sized race unit, it being only necessary to fashion the yoke of each support unit with an elevated aperture capable of passing the throat portion of the cup-like member and with a bearing surface adjacent the edges of the aperture for receiving the bearing surface of the cup-like member. Numerous production economies have been found to accrue from this construction.

An aperture 76 is advantageously fashioned in the bottom of the cup-like member 34, the aperture 76 being arranged to take a diameter sufficiently great freely to pass the lower stem portion 52 of the stud member 36. Similarly, the washer element 38 is provided with an aperture 78 which is arranged to take a diameter sufficiently great freely to pass the end portion 54 of the stud member. Hence, when the washer element 38 is assembled to the stud member 36, the washer element will abut an annular shoulder 80 defined between the portions 52 and 54 of the stud member. After the washer 38 has been so positioned, the end portion 54 can be riveted or otherwise formed over to establish a head 82, shown in FIG. 2, for coupling the washer element to the stud member. It is to be recognized that the end portion 54 may also be threaded to receive a nut whereby to dispense with the need for riveting the end. If desired, the distal edges of washer 38 may be formed as shown in FIG. 2 to follow the contour of the lower end of cup-like member 34.

Assembly of the caster device 10 can be conveniently achieved by inserting the cup-like member 34 through the aperture 28 formed in yoke 16 prior to mounting of the wheel 22. With the cup-like member 34 in place, the surface portions 30 and 72 are attached together as by the weldment 74. Thereupon, balls 68 are disposed in place and the stud member 36 properly located in the cup-like member. After balls 64 have been placed in position, the upper plate 32 can be located with the aperture 46 passing the stem portion 48.

Next, the washer 32 is mounted to the lower end of the cup-like member 34 with the aperture 78 passing the lower end portion 54 of the stud member. Thereafter, the heads 58 and 82 can be formed. Whereupon, the wheel 22 and the axle 24 are properly mounted to the yoke 16 to complete the assembly.

Operation of the caster device 10 will be apparent from the foregoing descriptions.

The specific example herein shown and described should be considered illustrative only. Various changes in structure may occur to those skilled in the art; and these changes are to be understood as forming a part of this invention insofar as they fall within the spirit and scope of the appended claims.

The invention is claimed as follows:

1. A caster comprising: an upper plate member having a depending circular boss; a stud member centrally depending from said boss and having an attachment formation at the lower end thereof, the upper end of said stud having means including a radially enlarged surface portion engaging the underside of said boss for interlocking the boss and stud against relative axial movement and a portion of said stud intermediate said surface portion and said attachment formation having a radial enlargement forming ball-race means spaced axially from said boss intermediate said boss and said attachment formation; a cup-like member underlying said plate member and having an upper ball-race surface situated in opposed spaced-apart relationship with said boss, and a central depending throat portion presenting a lower ball-race surface centrally apertured and contiguous with said upper ball-race surface and situated in opposed spaced-apart relationship with said ball-race means and providing an external attachment surface for engagement with said attachment formation; ball bearings engaging each of said contiguous ball-race surfaces to be totally contained within said cup-like member; and rollable means secured to said cup-like member to extend into floor-engaging contact therebeneath.

2. A caster according to claim 1 wherein said attachment formation includes a head and a washer element disposed between said head and the adjacent external surface of said cup-like member and substantially contoured to said external surface.

3. A caster as claimed in claim 1 wherein the radial enlargement extends upwardly within said throat portion and is integral with the said radially enlarged surface portion engaging the underside of the boss.

References Cited in the file of this patent

UNITED STATES PATENTS

| 1,471,307 | Chesnutt | Oct. 16, 1923 |
| 1,930,622 | Noelting | Oct. 17, 1933 |
| 2,111,561 | Herold | Mar. 22, 1938 |
| 2,521,948 | Rice et al. | Sept. 12, 1950 |

FOREIGN PATENTS

| 554,731 | Belgium | Feb. 28, 1957 |